Figure 1:
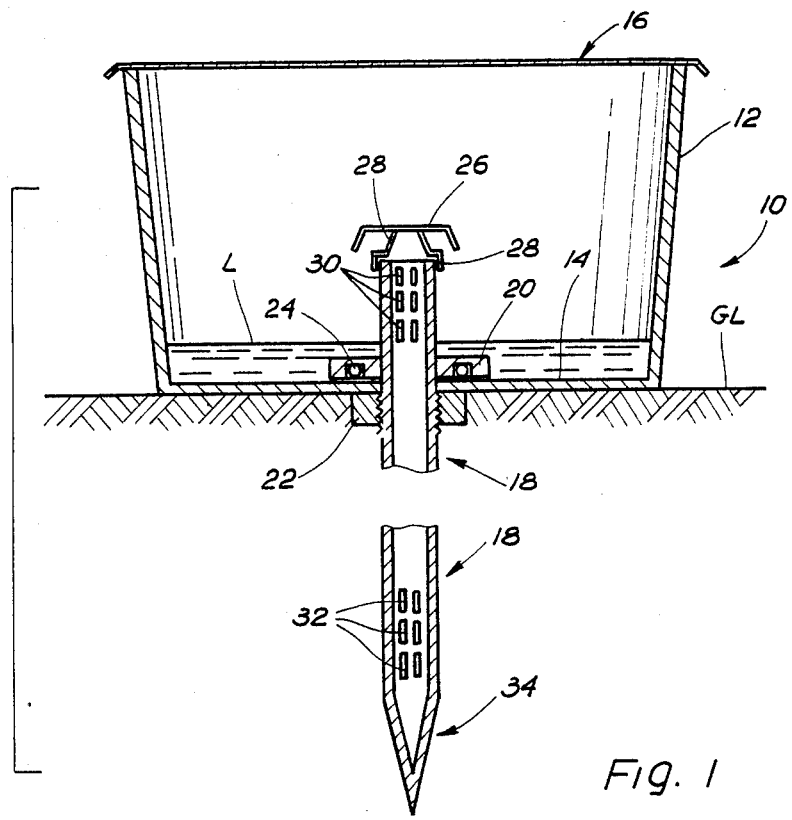

United States Patent [19]

Scragg

[11] Patent Number: 4,499,686
[45] Date of Patent: Feb. 19, 1985

[54] PLANT WATERING DEVICE

[75] Inventor: Edgar P. Scragg, Florida, South Africa

[73] Assignee: Prima Valves International (Proprietary) Limited, Bedfordview, South Africa

[21] Appl. No.: 403,268

[22] Filed: Jul. 29, 1982

[30] Foreign Application Priority Data

Aug. 5, 1981 [ZA] South Africa ..................... 81/5382

[51] Int. Cl.³ ............................................. A01G 29/00
[52] U.S. Cl. ................................................... 47/48.5
[58] Field of Search ...................... 47/48.5, 64, 60, 61, 47/62; 111/7.1, 7.2, 7.3, 7.4

[56] References Cited

U.S. PATENT DOCUMENTS

| | | | |
|---|---|---|---|
| 2,281,068 | 4/1942 | Farnham | 47/64 |
| 2,436,652 | 2/1948 | Lee | 47/61 |
| 2,791,347 | 5/1957 | Boehm | 47/48.5 |
| 3,754,352 | 8/1973 | Bates | 47/48.5 |
| 3,755,966 | 9/1973 | Smith | 47/48.5 |
| 3,805,445 | 4/1974 | Baumann | 47/63 |

Primary Examiner—Robert A. Hafer
Assistant Examiner—Bradley M. Lewis
Attorney, Agent, or Firm—Ladas & Parry

[57] ABSTRACT

A plant watering device comprises a receptacle for water with a tube extending downwardly from the receptacle. The tube is packed with a fibrous or particulate medium which permits water to percolate downwardly through it. The lower end of the tube is of spike form to enable it to be pushed into the ground. The upper end of the tube communicates with the receptacle so that water flows into the tube from the receptacle. Below the receptacle the tube has one or more outlets so that water percolating down the tube can escape into the surrounding earth.

1 Claim, 2 Drawing Figures

U.S. Patent  Feb. 19, 1985  4,499,686

PLANT WATERING DEVICE

This invention relates to a plant watering device.

To irrigate plants such as trees, shrubs and creepers, spray irrigation systems and drip irrigation systems are widely used. In both cases the capital investment is large and each has a number of disadvantages. In so far as spray irrigation is concerned, much of the water sprayed is lost as a result of wind drift and evaporation from the ground surface. Thus only a portion of the water used reaches the plants' root systems.

Drip irrigation requires that hose be run over the entire area to be irrigated. Each plant must have one or more drippers. The hose is, during cultivation, liable to damage. Also the pressure drop along the hose causes uneven irrigation to take place unless sophisticated drippers are used that provide substantially constant flow rates regardless of pressure. A further problem is that the plant roots grow into the dripper orifices and block them.

The present invention seeks to provide a simple plant watering device which overcomes the problems inherent in spray and drip irrigation systems.

According to the present there is provided a plant watering device comprising a receptacle for containing water and an outlet tube leading from said receptacle, the tube extending downwardly to below a base wall of said receptacle and containing a medium through which, in use, water contained in said receptacle can percolate.

Said medium is preferably sand. The nature of the sand i.e. its average particle size, and also the length of the tube, determine the rate at which water can percolate down the tube from the receptacle. Alternatively, the medium can be fibrous in nature and can comprise, for example, paper or cloth packed into the tube.

The tube can extend through the base wall of the receptacle with its upper end at a level above said base wall. Below the base wall, the walling of the tube can have apertures therein to permit water to emerge from the tube. The apertures are preferably in the form of slits as this minimises loss of said medium, particularly when the medium is sand, from the tube. The apertures can, however, be circular perforations if desired.

The receptacle itself can have a lid to minimise ingress of dirt into the receptacle. Alternatively, or additionally, the upper end of the tube can have a removable cover thereon to prevent dirt dropping directly into the tube. The tube, between the upper end thereof and the base wall of the receptacle, can have apertures therein to permit water to enter the tube. If the medium within the tube is sand then the tube is preferably packed with sand to a level below the lowermost of these apertures.

In one form of the device the lower end of the tube is in the form of a tapered spike. In another form said tube is open at the lower end thereof and a hollow cover of pointed shape is secured to the lower end portion of the tube, the cover extending above and below the lower end of the tube, there being a gap between the tube and that part of the cover which is above said lower end of the tube which gap forms a water flow path from the lower end of the tube to an outlet between the upper end of said cover and the tube.

According to a further aspect of the present invention there is provided a method of irrigating a tree, a shrub or a creeper which comprises placing adjacent the tree, shrub or creeper a device of the form hereinbefore described with said tube penetrating the ground to lead water downwardly from the receptacle to the root system of the tree, shrub or creeper.

Figure 2:
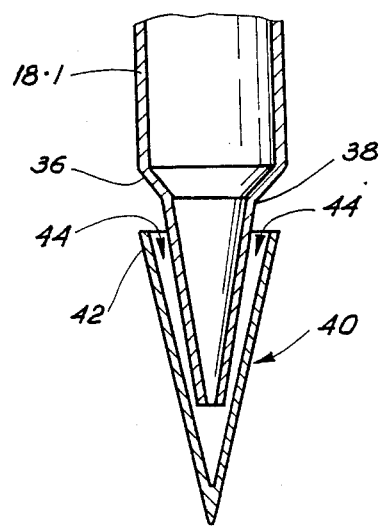

For a better understanding of the present invention reference will now be made, by way of example, to the accompanying drawing in which;

FIG. 1 is a diagrammatic vertical cross section through a plant watering device in accordance with the present invention; and FIG. 2 is a vertical cross section illustrating part of a modified plant watering device.

The plant watering device illustrated comprises a receptacle 10 having side walls 12, a base wall 14 and a removable lid 16.

A tube generally indicated at 18 passes through the base wall 14 of the receptacle 10, there being a flange 20 encircling the tube 18 immediately above the base wall 14. Below the base wall 14 the tube 18 is threaded and a nut 22 is screwed onto the tube 18. When the nut 22 is tightened against the underside of the base wall 14, the flange 20 is pulled down against the upper face of the base wall 14. A suitable seal, such as the O-ring 24 shown between the flange 20 and the upper face of the base wall 14, inhibits leakage from the receptacle 10 in the region of the tube 18.

The upper end of the tube 18 is open and there is a cap 26 which serves to prevent dirt dropping directly into the tube 18. The cap is readily removable and can, for example, simply be supported from the upper end of the tube 18 by three legs 28 only two of which are shown. Apertures 30 are provided in the walling of the tube 18 between the flange 20 and the upper end of the tube. These apertures can be, for example, circular perforations or elongate slits. Elongate slits are shown.

Below the nut 22 the tube 18 is also formed with a series of apertures, these being designated 32 and again being in the form of elongate slits (as shown) or circular perforations. The lower end of the tube 18 is in the form of a tapering spike 34 and is closed.

The tube 18, between its closed lower end and a level below the apertures 30, is packed with a porous medium. The preferred medium is a particulate one such as sand. Where such a medium is used the apertures 30 and 32 in the walling of the tube are preferably in the form of narrow slits to minimise loss of sand from the tube. If circular perforations are used then these should be sufficiently small to prevent the grains of sand falling through them out of the tube.

In use of the watering device, it is placed next to the tree, shrub or creeper to be watered and pressed down so that the spike 34 at the lower end of the tube 18 penetrates the ground. The line GL in the drawing approximately indicates ground level once the device is in position.

The lid 16 is then removed and the receptacle 10 is filled or partly filled with water or an aqueous solution of fertilizer in water. Any dirt, grit or other particles in the water, and any particles which subsequently enter the receptacle, are deposited as a layer L which is below the lowermost aperture 30 and consequently does not interfere with operation of the device.

Water enters the tube 18 through the apertures 30 and percolates downwardly through the particulate or fibrous material with which the tube is packed. Eventually, the water emerges through the apertures 32 and enters the ground around the tube 18.

It will be understood that, as a consequence of this, water reaches the root area of the plant and is not simply deposited on the ground surface from which it evaporates rapidly. Should the rate at which the water level in the receptacle drops slow down, then this is an indication that either the flow paths within the medium packed into the tube 18 have been blocked or that the apertures 32 have been blocked, perhaps by the roots of the tree, shrub or creeper being irrigated. If the medium has the passages therein blocked, then all that is required is that the cap 26 be removed and that the medium be pulled or shaken from the tube and then re-packed after, if necessary, washing. If roots are the cause of the blockage, then the device need only be lifted bodily from the ground and then pushed back in again after, if necessary, clearing away those roots which are still blocking the apertures.

The tube 18 is preferably pre-packed with a medium which gives the desired flow rate. To enable a greater or lesser flow rate to be obtained, the nature of the medium or the quantity of the medium is changed. For example, a greater flow rate can be obtained by replacing the sand in the tube 18 by a coarser sand or by decreasing the length of the tube which is filled with sand.

It will be understood that the water flowing through the tube is filtered in that finer particles therein will tend to be trapped by the medium within the tube.

Tubes of various dimensions and with various mediums therein can be provided so that the user can vary the flow rate of his device simply by replacing one tube by another.

The device described above with reference to FIG. 1 is intended for use in orchards, gardens etc. and is consequently of a size such that it can receive, for example, 25 to 100 liters of water. It is also possible for the unit to be of a size such that it contains, say, one quarter or one half of a liter and for the unit then to be used domestically. One possible domestic use is to water houseplants. Another possible domestic use is in connection with cut flowers which have their stems pressed into a block of foamed synthetic plastics material. The tube 18 is also pushed into this block and maintains it moist. The term 'plant' as used herein is thus intended to include cut flowers.

Where a small volume receptacle 10 is employed, this can be vacuum formed and the lid 16 can be secured, for example by heat sealing, to the receptacle. A filling opening can be formed in the lid and there can be a plug or cap for closing the filler opening. An air vent can be provided in the plug or cap, or elsewhere in the lid or the receptacle, to enable air to bleed into the receptacle 10. The rate of air flow through the vent, if sufficiently low, itself exerts some control over the rate at which water can flow out of the receptacle.

In FIG. 2 the tube is designated 18.1 and is of cylindrical form above a step 36. Below the step 36 the tube 18.1 is in the form of a tapered section 38 which is open in its lower end. A hollow cover 40 of pointed shape is pushed onto the section 38. The upper edge 42 of the cover 40 is spaced from the step 36 thereby to provide a gap 44. The cover 40 is connected to the section 38 in any suitable, positive manner. This is necessary to ensure that the cover 40 is not detached when the device is pulled out of the ground.

Water percolating down the section 38 runs into the cover 40 and then flows upwardly between the cover 40 and section 38 to emerge through the gap 44. Any particulate material which is carried out of the section 38 is trapped in the tip of the cover 40.

I claim:

1. A plant watering device comprising a receptacle for containing water and an outlet tube the interior of which communicates with the interior of said receptacle and which extends downwardly to below a base wall of said receptacle, said tube being open at the lower end thereof and there being a hollow cover of pointed shape secured to the lower end portion of the tube, the cover extending above and below the lower end of the tube and there being a gap between the tube and that part of the cover which is above said lower end of the tube, the space within the tube being packed with a medium through which, in use, water contained in said receptacle percolates before emerging from said tube through said gap which forms a water flow path from the lower end of the tube to an outlet between the upper end of said cover and the tube.

* * * * *